United States Patent [19]

Kennedy

[11] Patent Number: 4,900,231

[45] Date of Patent: Feb. 13, 1990

[54] AUXILIARY COMPRESSOR AIR SUPPLY FOR AN AIRCRAFT

[75] Inventor: Norman J. Kennedy, Bellevue, Wash.

[73] Assignee: The Boeing Company, Seattle, Wash.

[21] Appl. No.: 869,391

[22] Filed: May 30, 1986

[51] Int. Cl.$^4$ .............................................. F04D 13/02

[52] U.S. Cl. ...................................... 417/16; 417/374

[58] Field of Search ........................... 417/15, 16, 374; 98/1.5; 60/39.33, 39.07; 74/675

[56] References Cited

U.S. PATENT DOCUMENTS

| | | | |
|---|---|---|---|
| 1,036,328 | 8/1912 | Pierce | 417/16 |
| 2,104,381 | 1/1938 | Alexander et al. | 62/134 |
| 2,104,387 | 1/1938 | Hull et al. | 62/124 |
| 2,150,276 | 3/1939 | Gorman | 417/16 |
| 2,271,415 | 1/1942 | Conlon | 62/134 |
| 2,374,239 | 4/1945 | Sedelle | 60/39.15 |
| 2,405,670 | 9/1946 | Price | 98/1.5 |
| 2,538,299 | 1/1951 | Dewandre | 74/675 |
| 2,621,476 | 12/1952 | Sedille | 60/39.15 |
| 2,723,531 | 11/1955 | Wosika et al. | 60/39.15 |
| 2,881,330 | 3/1959 | Oster | 60/39.15 |
| 2,939,289 | 6/1960 | Clark | 60/39.15 |
| 3,290,878 | 12/1966 | Wickman | 74/675 |
| 3,861,484 | 1/1975 | Joslin | 74/675 |
| 4,514,991 | 5/1985 | Zinsmeyer | 74/675 |
| 4,586,400 | 5/1986 | Nygren | 74/675 |

FOREIGN PATENT DOCUMENTS

| | | | |
|---|---|---|---|
| 2151707 | 7/1985 | United Kingdom | 60/39.33 |

*Primary Examiner*—Louis J. Casaregola

*Attorney, Agent, or Firm*—Delbert J. Barnard

[57] ABSTRACT

Engine (10) shaft power provides a first input (16) for a differential gear box (18). This input (16) is additive in a gear box (18) to a second input (30) from an electric motor (32). The output (22) of the gear box (18) powers a rotor (24) of an auxiliary compressor (12) which produces compressed air for providing needed pneumatic services aboard the aircraft. Compressor rotor speed is sensed (sensor 40) and used for controlling operating current (via controller 42 and frequency converter 44) to the electric motor (32). Motor (32) is an electronically commutated brushless electric motor having a high torque output which is substantially linearly proportional to the input current.

11 Claims, 2 Drawing Sheets

AUXILIARY COMPRESSOR AIR SUPPLY FOR AN AIRCRAFT

TECHNICAL FIELD

This invention relates to the generation of compressed air for use in providing pneumatic services aboard an aircraft. More specifically, it relates to the provision of an auxiliary compressor for generating the pneumatic services air supply which is driven by engine shaft power along during relatively high power operation of the engine, and by both engine shaft power and an electric motor during periods of low power operation of the engine.

BACKGROUND ART

The operation of an aircraft requires the provision of a source of compressed air for pressurizing the cabin of the aircraft and providing other pneumatic services aboard the aircraft. The compressed air used for the pneumatic services has been obtained in different ways. One way is to design the engines of the aircraft in such a way that air can be bleed off from the compressors of the engines and used for the pneumatic services. It is also known to provide auxiliary compressors aboard aircraft and drive them directly or indirectly from the engine. Known direct drive systems utilize an auxiliary shaft which is connected at one end to the engine shaft and at its opposite end to the auxiliary compressor. Known indirect systems utilize a hydraulic pump which is driven by the engine shaft and which in turn drives a hydraulic motor which is connected to the auxiliary compressor.

The efficient operation of advanced technology engines requires the passage of relatively low volumes of compressed air through the engines. Air cannot be bled from these engines for supplying the pneumatic services without severly affecting the function of these engines as the prime mover for the aircraft. If the engines are redesigned so that sufficient engine bleed air is available, the size, weight, and efficiency of the engines is compromised.

Known systems for producing pneumatic services air aboard aircraft, as alternates to bleed air systems, have required compromises in operating efficiencies of the engines over a wide band of operating requirements. The known systems which comprise auxiliary air compressors coupled to the engine either require gear shifting transmissions, or are designed to handle worst case design conditions and operate in surge relief during some of the normal operating conditions. Known systems which comprise remotely powered compressors, driven either by hydraulic motors powered by the hydraulic system aboard the aircraft or electric motors powered by the electric system aboard the aircraft, take substantial amonts of power from the aircraft hydraulic or electrical systems, and are generally also chacterized by costly line losses of power.

The system of the present invention applies recent technological advances in electric motors with the best features of known auxiliary compressor sytems, to produce a maximum efficiency system which does not require the mechanical complexity of gear shifting and/or slip couplings, and which does not experience substantial amounts of power waste.

DISCLOSURE OF THE INVENTION

In accordance with the present invention, an auxiliary compressor is provided for generating pneumatic service air. The output of a differential gearing is drivenly connected to the compressor rotor. Engine shaft power provides a first input to the differential gearing. An electric motor provides a second input for the differential gearing. During cruise and higher power operation of the aircraft, engine shaft power alone is used for driving the air compressor. During low power operation of the engine, a droop in air compressor output is sensed, and this sensed condition is used as a basis for controlling the electric motor, in a manner such that the drive input of the electric motor combined with the drive input of the engine shaft will produce a desired output from the air compressor.

In accordance with an aspect of the invention, the electric motor is a variable speed electric motor, of a type producing an output torque that is substantially linearly proportional to the input current to the motor.

Also in accordance with an aspect of the invention, the electric motor is a brushless permanent magnet type motor characterized by a relatively large torque output and a relatively small size.

Other more detailed features of the invention will be hereinafter described in conjunction with the best mode of the invention.

BEST MODE FOR CARRYING OUT THE INVENTION

Figure 1:
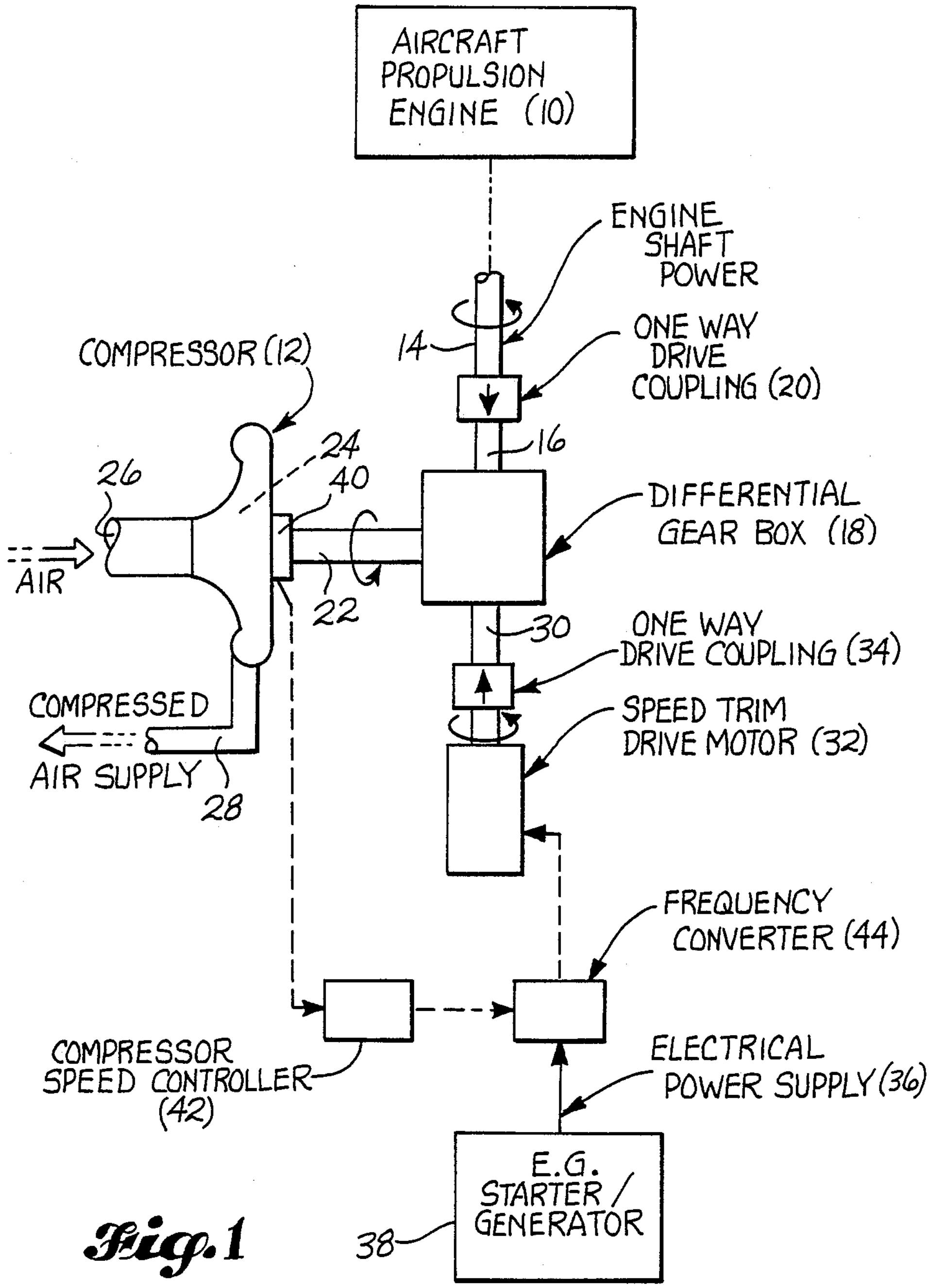
FIG. 1 of the drawing is a schematic diagram of an embodiment of the present invention, such diagram including both legends and reference numerals.

Referring to FIG. 1, an aircraft propulsion engine 10 is shown by a block diagram. This engine 10 is a gas turbine engine. It comprises a compressor section, a combustion chamber section and a turbine section, in series.

In accordance with the present invention, an auxiliary compressor 12, i.e. a compressor separate from the engine 10, is provided for generating the compressed air that is used for cabin pressurization, air conditioning, etc. Herein this compressed air will be sometimes referred to as the "pneumatic services air."

In accordance with the invention, engine shaft power is used for driving the compressor 12 during relatively high power operation of the engine 10, e.g. during climb and cruise operation. As is known per se, a power takeoff shaft 14 is provided which at one end is suitably connected to the turbine shaft of the engine 10, e.g. by meshing bevel gears.

In accordance with the present invention, the shaft 14 provides a first input 16 into a differential gear box 18. Shaft 14 may include a one-way drive coupling 20.

The differential gear box 18 has an output shaft 22 which is connected to the rotor 24 of the compressor 12. Compressor 12 includes an air inlet 26 and an air outlet 28. The outlet 28 is connected to deliver the effluent of the compressor 12 to the various pneumatic services, e.g. to the aircraft cabin for pressurization. Of course, the pneumatic services system will include various controls and conditioning components which are not a part of this invention.

In accordance with the invention, the differential gear box 18 includes a second input 30. This input 30 includes a shaft which is driven by an electric motor 32, herein termed "the speed trim drive motor." The output shaft of motor 32 may include a one-way drive coupling 34.

The electric motor 32 is an electronically commutated brushless electric motor. This type of motor is a known but relatively new development and it is the availability of this motor which has made the present invention feasible and advantageous. This type of motor owes its basic simplicity and absolute minimum of moving parts to a permanent magnet field assembly (e.g. Samarium cobalt magnets). The motor 12 is characterized by high linearity. The torque increases directly with input current, independent of speed or angular position. The motor can be constructed in many different configurations, each of which involves a small envelope, enabling the motor 32 to be fitted into a quite small space. By way of example, a motor of this type, capable of generating about 102 hp, can fit within an envelope measuring about 12 inches long by about 8 inches in diameter.

All aircraft are provided with some sort of electrical power supply 36. In accordance with an aspect of the invention, the aircraft may include a starter generator 38 that is first used for intiating start rotation of the engine 10. Then, when engine 10 is operating, the starter/generator 38 will be coupled to the engine 10, to be driven thereby, and controlled to function as a generator. Of course, the present invention does not rely on the presence of this particular type of electrical power supply. Rather, the electrical power supply 36 may take any suitable form. It is only necessary that the aircraft include an electrical power supply 36 of some form.

In accordance with an aspect of the invention, a device or sensor is associated with the compressor 12, to measure the output of the compressor 12. This device may be in the form of a shaft speed sensor 40 which measures the rotational speed of the output shaft 22 from the gear box 18. This also constitutes a measurement of the rotational speed of the compressor rotor 24.

The sensor 40 produces a signal which is transmitted to a compressor speed controller 42. The compressor speed controller 42 may be in the form of a microprocessor which takes the signal from sensor 40 and compares it with model information. During periods of reduced power operation of the aircraft, e.g. descent with idle engine power, a droop in compressor speed is detected by the sensor 40. In response, the compressor speed controller 42 functions to operate a frequency converter 44 which is interconnected between the electrical power supply 36 and the speed trim drive motor 32. It may be desired to simply maintain operation of the compressor 12 at a constant speed, in which case the compressor speed controller 42 and the frequency converter 44 function to operate the speed trim drive motor 32 in a manner resulting in its input to the differential gear box 18, combined with the decreased power input from the engine shaft 14, providing a constant output rotation of the gear box shaft 22. Or, it may be desired to obtain a pattern of operation of the compressor 12 which is not constant, but which requires an input from the drive motor 32 in addition from the engine shaft power inputs 16. This selected operation of the compressor 12 may be provided by other command information that is processed in the compressor speed controller 42.

The sensor 40 for detecting speed of rotation compressor rotor shaft, the compressor speed controller or microprocessor 42 and the frequency converter 44 are all elements which are known per se and are commercially available. Accordingly, these common elements of the system are merely shown in a schematic or block diagrm form.

The one-way drive coupling 20, 34 may be one-way overriding clutches of the type shown in U.S. Pat. No. 2,723,531 (elements 17, 24, 32, 34), granted Nov. 15, 1955, to Leond R. Wosika et al. The one-way drive coupling 20 in shaft 16 functions to prevent the second input 30 into the differential gear box 18 from back driving the shaft 14. The one-way drive coupling 34 between motor 32 and gear box input 30 prevents a first input 16 from back driving the motor 32.

The differential gear box 18 is per se not a part of the present invention; it involves known technology. Accordingly the differential gear box 18 is also shown in block diagram form in FIG. 1. The differential gear box 18 functions to produce an output shaft speed which is additive of the two input shaft speeds, or which is at least a function of the sum of the two inputs 16, 30.

Figure 5:
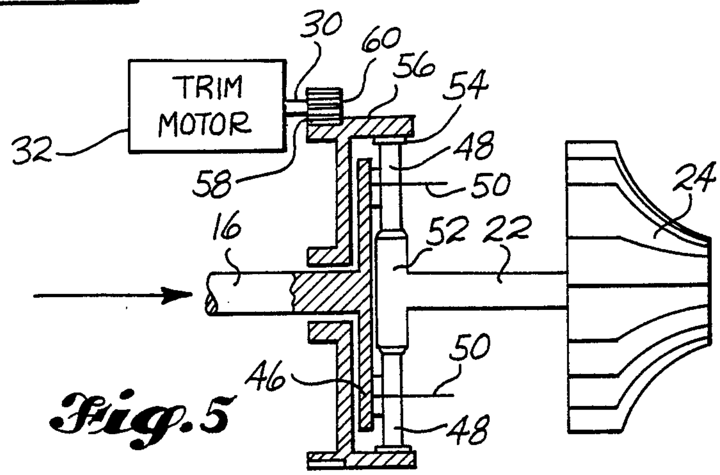
FIG. 5 is a schematic view of a differential gear box and its connection between the main engine shaft, the speed trim motor and the compressor rotor.

FIG. 5 sets forth the drive system in schematic form, minus right angle gearing, etc. The shaft 16 which is connected to the drive shaft of the main engine is shown connected to a rotary carrier 46. The carrier 46 carries a plurality of planet gears 48, each suitably mounted to rotate about an axis 50. The gears 48 mesh with a sun gear 52 and a ring gear 54. The sun gear 52 is connected to the compressor shaft 22. Ring gear 54 is a part of a rotating member 56 which includes a second ring gear section 58. The output shaft 30 of the speed trim drive motor 32 is connected to an output gear 60 which meshes with ring gear 58. Rotation of shaft 16 produces a rotation of the carrier 56 and the planet gears 48 carried thereby. Carrier movement of the gears 48 results in the gears 48 orbiting about the axis of ring gear 54 while at the same time rotating about their individual axes 50. As the gears 58 move they impart rotation to the sun gear 52 which in turn imparts rotation to the compressor shaft 22 and the compressor rotor 24. The gearing is designed so that when the trim motor 32 is operating it drives the member 56 in a direction causing it to impart a driving force on the gears 48 which is additive to the driving force from the shaft 16 and the carrier 46. This enables operation of the trim motor 32 in such a manner that the trim motor can be used for maintaining the drive speed of the shaft 22 and the rotor 40, during low power operation of the main engine.

Figure 2:
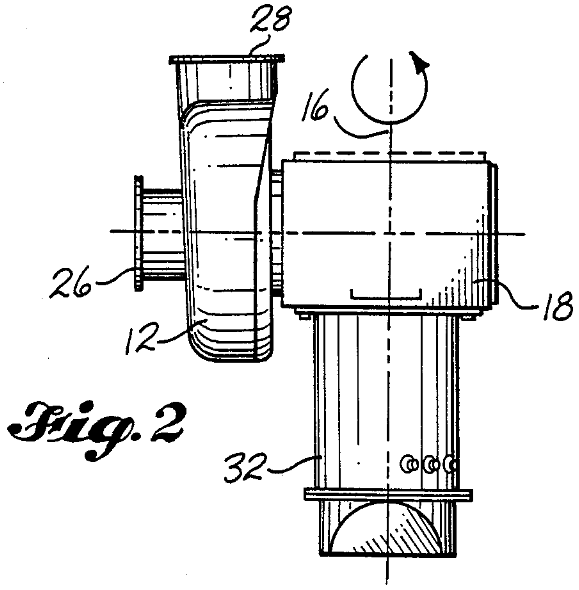
FIG. 2 is a top plan view of an example package design of a compressor, a differential gear box and a speed trim motor.
Figure 3:
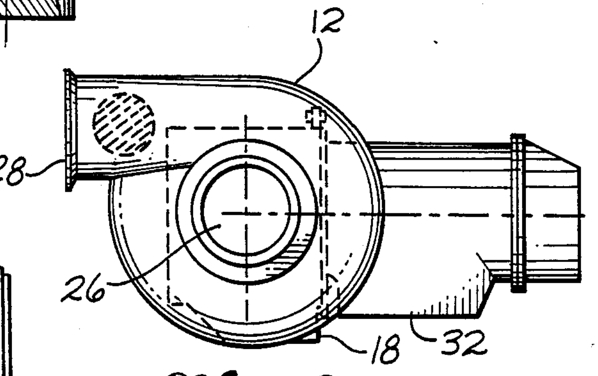
FIG. 3 is an elevational view of the package shown by FIG. 2, looking toward the inlet of the compressor.
Figure 4:
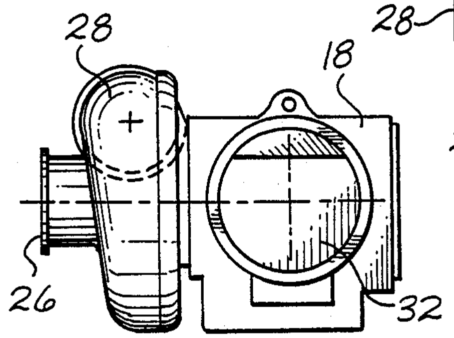
FIG. 4 is an end elevational view of the package shown by FIGS. 2 and 3, looking towards an end of the speed trim motor.

FIGS. 2–4 disclose an advantages package design of the auxiliary compressor 12, the differential gear box 15 and the speed trim drive motor 32. This package is relatively small and can fit within space available adjacent the aircraft engine. FIG. 2 has been termed a top plan view, FIG. 3 has been termed a side elevational view, and FIG. 4 has been termed an end elevational view. This was done for the purpose of describing the orientation of the views shown by FIGS. 2–4. These views are orthographic projections. Of course, in an actual use installation, the positioning of the various components may vary. The shaft 16 may extend away from the main engine shaft in any one of a large number of positions. As stated above, the use of the plan view, side elevational view and end elevational view terminology was done merely to relate the views to each other. They do not denote the actual positioning of the package in the aircraft. This positioning may vary substantially.

In the package views (FIGS. 2–4) the shaft 16 is shown to be coaxially related to the output shaft of the speed trim drive motor 32. The compressor rotor shaft 22 is shown to extend at a right angle to the shafts 16, 30. It is well within the skill of a person having ordinary skill in the art, to design a differential gear box transmission which will operate like the transmission shown schematically by FIG. 5, but which has the input to output orientation of the axes that is shown by FIGS. 2–4. In view of this fact, and in view of the fact that the invention does not depend upon the package design shown by FIG. 2–4 (i.e. the package design may vary from that shown), the details of construction of a suitable differential gear box is not considered to be a part of the present invention. The present invention is a system invention in which the differential gear box can exist in more than one form.

The present invention makes it possible to operate advanced technology engines in an efficient manner because it is not necessary to design these engines so that they will have to supply substantial amounts of bleed air. The engines can be efficiently operated during climb and cruise maneuvers and sufficient shaft power will be available to by itself drive the compressor 12. The differential gear box 18 and the speed trim drive motor 32 are relatively small in size, and are relatively light weight in comparison to the advantages obtained by their use when the need arises. During periods of low power operation of the engines, e.g. descent maneuvers, the speed trim drive motor 32 provides a second input 30 to the differential gear box 18, which is additive to the first input 16, to produce a desired output 22 for driving the compressor rotor 24.

An additional benefit of the system of the invention is that while the aircraft is on the ground, ground electrical power may constitute the electrical power supply 36. This would make it possible to use the compressor 12 to generate air conditioning air while the aircraft is on the ground and the engines 10 are not operating.

The embodiment that has been illustrated and described represents an example of the invention. As should be apparent, various modifications in component make-up and arrangement can be made without departing from the spirit of the invention. Accordingly, I am not to be limited by the details of the example embodiment, but only by the claims, interpreted in accordance with established prinicipals of claim interpretation, including the doctrine of equivalents.

What is claimed is:

1. An air supply system for an aircraft, comprising:

a propulsion engine having an output shaft;

an air compressor separate from said engine having an inlet, an outlet and a rotor;

differential gearing means having an output connected to the compressor rotor, a first input drivenly connected to the output shaft of the aircraft engine, and a second input;

an electric motor drivingly connected to the second input; and means responsive to a condition of the compressor for operating the electric motor in an amount sufficient to provide a predetermined desired amount of input drive to the differential gearing, for helping to drive the compressor rotor during periods of low output from the engine shaft, for the purpose of establishing a desired output from the air compressor.

2. An air supply system according to claim 1, wherein the first input to the differential gearing means comprises a shaft which includes a one-way drive coupling arranged to prevent the second input from back driving the first input.

3. An air supply system according to claim 1, wherein the second input comprises a shaft which includes a one-way drvie coupling for preventing the first input from back driving the second input.

4. An air supply system according to claim 1, wherein the electric motor is a variable speed motor.

5. An air supply system according to claim 4, where the means responsive to a condition of the compressor for operating the electric motor comprises control means responsive to the speed of rotation of the compressor rotor, to produce a signal, and means responsive to said signal for controlling the output speed of the electric motor.

6. An air supply system according to claim 1, wherein the eletric motor is of a type which produces an output torque that is substantially linearly proportional to the input current to the motor.

7. An air supply system according to claim 6, wherein the means responsive to a condition of the compressor for operating the electric motor comprises control means responsive to the speed of rotation of the compressor rotor.

8. An air supply system according to claim 6, wherein the electric motor is a brushless permanent magnet motor.

9. A method of generating a supply of compressed air aboard an aircraft, for use to provide pneumatic services aboard the aircraft, comprising:

providing an auxiliary compressor of a type including a rotor;

providing a mechanical drive connection between the aircraft engine and the compressor rotor, so that the rotor is driven by engine shaft power;

using the engine shaft power alone to drive the compressor rotor during cruise power and higher power operation of the engine;

using an electric motor in conjunction with engine shaft power for driving the compressor rotor during low power operation of the aircraft engine.

10. A method according to claim 9, comprising sensing a condition of the compressor to produce a signal indicative of the output of the compressor, and using said signal for controlling the electric motor, for establishing a desired output from the air compressor.

11. A method according to claim 9, comprising providing a differential gear box which includes a first input drivenly connected to engine shaft power, a second input drivenly connected to the electric motor, and an output connected to the compressor rotor, and using said differential gear box to add together the input from engine shaft power and the input from the electric motor, to provide a combined out for driving the compressor rotor.

* * * * *